US008483998B2

(12) United States Patent
Lovell et al.

(10) Patent No.: US 8,483,998 B2
(45) Date of Patent: Jul. 9, 2013

(54) IN SITU EMISSION MEASUREMENT FOR PROCESS CONTROL EQUIPMENT

(75) Inventors: Michel Ken Lovell, Marshalltown, IA (US); Carter B. Cartwright, Ames, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 239 days.

(21) Appl. No.: 12/887,791

(22) Filed: Sep. 22, 2010

(65) Prior Publication Data

US 2011/0071688 A1    Mar. 24, 2011

Related U.S. Application Data

(62) Division of application No. 11/336,558, filed on Jan. 20, 2006, now Pat. No. 7,818,092.

(51) Int. Cl.
*G06F 3/00* (2006.01)

(52) U.S. Cl.
USPC ....... 703/2; 703/9; 700/281; 73/861; 137/487

(58) Field of Classification Search
USPC .............. 703/2, 9; 137/487; 73/861; 700/281
See application file for complete search history.

(56) References Cited

U.S. PATENT DOCUMENTS

| 3,265,308 A | 8/1966 | Hopkins |
| 3,273,348 A | 9/1966 | Hart |
| 3,550,426 A | 12/1970 | Griffo |
| 3,878,376 A | 4/1975 | Sholes, Jr. et al. |
| 3,927,563 A | 12/1975 | Konomi |
| 4,474,053 A | 10/1984 | Butler |
| 4,962,666 A | 10/1990 | Adney et al. |
| 4,993,256 A | 2/1991 | Fukuda |
| 5,047,965 A | 9/1991 | Zlokovitz |
| 5,367,888 A | 11/1994 | Muston et al. |
| 5,388,607 A | 2/1995 | Ramaker et al. |
| 5,563,335 A | 10/1996 | Howard |

(Continued)

FOREIGN PATENT DOCUMENTS

| EP | 1 168 115 A | 1/2002 |
| JP | 01-110218 A | 4/1989 |

(Continued)

OTHER PUBLICATIONS

Fairchild Industrial Products Company, "Fairchild Model 4000A Pneumatic Precision Regulator Installation, Operation and Maintenance Instructions," (2002).

(Continued)

*Primary Examiner* — Thai Phan
(74) *Attorney, Agent, or Firm* — Marshall, Gerstein & Borun LLP

(57) ABSTRACT

A system and method for accurately measuring supply gas consumed by a particular process control component within a process control system is disclosed. Enhanced measurement accuracy is derived from measuring the consumption of the process control component in a normal operating mode of the process control system. The amount of fluid expended by one process control component is separated by a fluid control system from the amount of supply gas expended in actuating other process control components. The amount of fluid expended by each component may be determined by measuring a decrease in a fluid within a vessel having a known quantity that independently supplies supply gas to each component during its operation.

14 Claims, 10 Drawing Sheets

U.S. PATENT DOCUMENTS

| | | | |
|---|---|---|---|
| 5,636,653 | A | 6/1997 | Titus |
| 5,983,706 | A | 11/1999 | Marks et al. |
| 6,238,910 | B1 | 5/2001 | Custance et al. |
| 6,280,408 | B1 | 8/2001 | Sipin |
| 6,378,356 | B1 | 4/2002 | Ruiz et al. |
| 6,382,923 | B1 | 5/2002 | Gray |
| 6,550,314 | B2 | 4/2003 | Summers et al. |
| 6,553,810 | B2 | 4/2003 | Webb et al. |
| 6,591,201 | B1 * | 7/2003 | Hyde ............ 702/45 |
| 6,678,584 | B2 | 1/2004 | Junk et al. |
| 6,722,185 | B2 | 4/2004 | Lawson et al. |
| 6,796,324 | B2 | 9/2004 | Dilger et al. |
| 6,892,756 | B2 | 5/2005 | Schulze |
| 6,997,202 | B2 | 2/2006 | Olander |
| 7,114,560 | B2 * | 10/2006 | Nguyen et al. ............ 166/249 |
| 2003/0098069 | A1 * | 5/2003 | Sund et al. ............ 137/487.5 |
| 2003/0182999 | A1 | 10/2003 | Kouno |
| 2003/0189492 | A1 | 10/2003 | Harvie |
| 2004/0112435 | A1 | 6/2004 | Olander |
| 2004/0149436 | A1 | 8/2004 | Sheldon |
| 2004/0256099 | A1 * | 12/2004 | Nguyen et al. ............ 166/249 |
| 2005/0056316 | A1 | 3/2005 | McCarty |
| 2006/0041335 | A9 | 2/2006 | Rossi et al. |
| 2006/0054219 | A1 * | 3/2006 | Sund et al. ............ 137/487.5 |
| 2007/0169564 | A1 * | 7/2007 | Lovell et al. ............ 73/861.42 |
| 2008/0280687 | A1 | 11/2008 | Fontijn et al. |

FOREIGN PATENT DOCUMENTS

| | | |
|---|---|---|
| JP | 2003-140752 A | 5/2003 |
| JP | 2004-084540 A | 3/2004 |
| JP | 2009-502292 A | 1/2009 |
| WO | WO-2006/075406 A1 | 7/2006 |

OTHER PUBLICATIONS

International Search Report for International Application No. PCT/US2006/047104, dated Jun. 20, 2007.

Written Opinion for International Application No. PCT/US2006/047104, dated Jun. 20, 2007.

Office Action for Japanese Application No. 2008-551262, dated Dec. 26, 2011.

Office Action for Japanese Application No. 2008-551262, dated Nov. 14, 2012, with English translation.

* cited by examiner

# IN SITU EMISSION MEASUREMENT FOR PROCESS CONTROL EQUIPMENT

REFERENCE TO RELATED APPLICATIONS

This is a divisional of U.S. patent application Ser. No. 11/336,558, filed Jan. 20, 2006, now U.S. Pat. No. 7,818,092, the entire disclosure of which is incorporated herein by reference.

FIELD OF THE DISCLOSURE

This disclosure relates generally to the measurement of fluid consumption by process control equipment and, more particularly, to the determination of the quantity of a supply fluid expended by particular process instruments within a control system, or by an entire process control loop.

BACKGROUND

Process control systems typically use a fluid supply such as compressed air or gas to operate pneumatic process control components within the process control system. Process control systems operating in remote locations are also known to use the process media to operate components such as the pneumatic instruments and pneumatic devices such as control valve actuators. The pneumatic supply fluid is consumed during operation (i.e. a portion of the supply gas is exhausted during operation and is not captured or recycled). Depending on the process being controlled, this expenditure of supply gases can be problematic and expensive in certain instances. For example, in the natural gas industry, some pneumatic instruments operate by using the natural gas as a pneumatic supply source. Thus, the loss of high value fluids like natural gas can provide significant economic motivation to operators to detect and accurately measure leakage and, where possible, limit the consumption or bleeding of natural gas. The environmental impact of natural gas leakage and potential regulatory penalties for exceeding limits on levels of consumption or emission of natural gas create additional incentives to measure and limit those emissions. Additionally, operators may seek to measure the quantity of natural gas consumed to quantify payments for mineral rights or to facilitate tuning of the process control equipment in order to better optimize fluid consumption during instrument operation.

The total amount of supply fluid or gas used to operate a process control system may be divided into two distinct categories: supply fluid required to work the pneumatic control devices such as a control valve and supply fluid consumed or expended to operate the pneumatic control instrument. For example, in a process control system comprising a control valve and a level controller, there is an amount of supply gas that is used to actuate or move the control valve and an amount of supply gas that is consumed during operation of the level controller to generate the pneumatic signal to actuate the control valve. Typically, these two values are not distinctly identifiable, and therefore, the supply gas consumption of the process control system is approximated. As such, conventional methods do not provide an accurate estimate of the total supply gas consumption of a particular device in the system.

One conventional method of measuring supply gas consumption within a process control system is to route a pneumatic instrument's exhaust gas through a flow meter. This traditional flow measurement technique can be very inaccurate when the exhaust flow is intermittent or sporadic because the bandwidth or response time of conventional flow meter is too slow to record the deviations in flow. Additionally, the exhausted gas includes the amount of supply fluid expended by the pneumatic instrument and the amount of supply gas used to operate the valve making the individual discrimination between these two quantities very difficult. It would therefore be desirable for there to be a reliable system and method to accurately measure supply gas consumption of a particular process control instrument, or other device, within a process control system.

SUMMARY

A system and method for accurately measuring supply gas consumed by a particular process control component within a process control system is disclosed. Enhanced measurement accuracy is derived from measuring the consumption of the process control component in a normal operating mode of the process control system. The amount of fluid expended by one process control component is separated by a fluid control system from the amount of supply gas expended in actuating other process control components. The amount of fluid expended by each component may be determined by measuring the decrease in a fluid within a vessel having a known quantity that independently supplies supply gas to each component during its operation.

DETAILED DESCRIPTION OF THE PREFERRED EMBODIMENTS

For purposes of this disclosure, the term "fluid" is used herein to refer to the gaseous media used to power pneumatic instruments or pneumatic devices within a control system. The fluid type provided by the controlled fluid supply may be the same as the fluid type provided by the normal instrument fluid supply, or may be a different fluid. For example, the fluid supplied by the controlled fluid supply may be natural gas, nitrogen, or compressed air, and the fluid supplied by the instrument fluid supply may be the same fluid as supplied by the controlled fluid supply or some other compatible fluid such as the three fluids mentioned above. It should be understood by one of ordinary skill in the art that one could readily convert gas consumption quantities to reflect the actual consumption during normal operations when the controlled fluid supply is not the process media, such as using compressed air or nitrogen to operate pneumatic components as opposed to natural gas. The user would only need to use known gas correction factors to account for differences in the fluid properties. Additionally, in this disclosure the term "activated" refers to placing a particular fluid control component in a predetermined flow control state. For example, a normally-closed valve is activated when its associated control signal commands the valve to move from a closed state to an non-closed state. One skilled in the art appreciates that various types of control signals (i.e. +/−polarity) can be applied to fluid control component to activate/de-activate or change flow states without departing from the spirit and scope of this disclosure.

Figure 1:
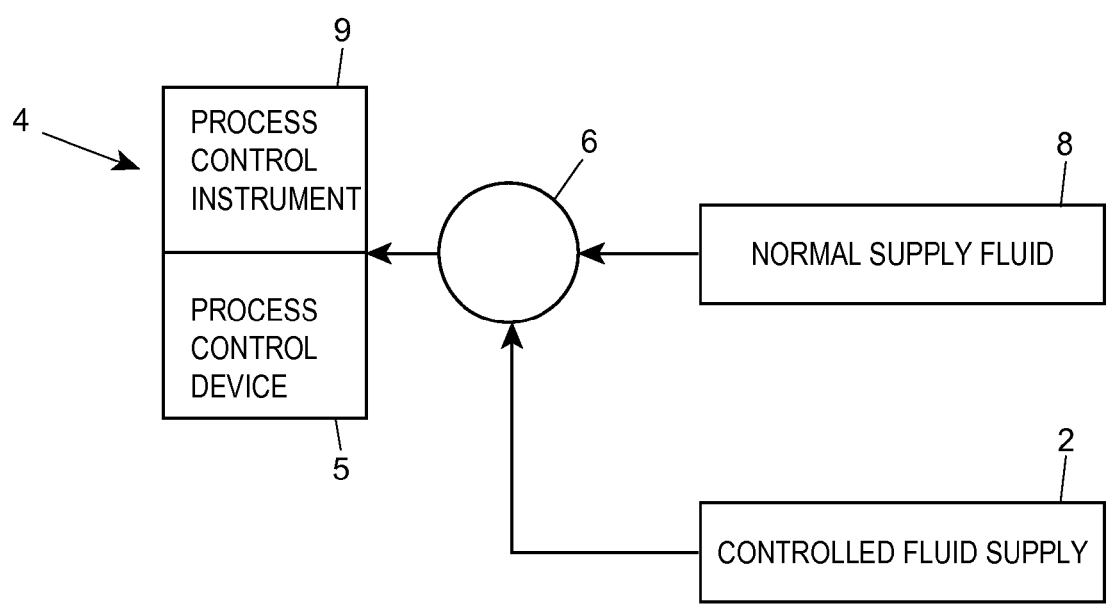
FIG. 1 is a block diagram illustrating a process control system with primary and a secondary fluid supply system for determining the fluid consumption during normal operation of the process control system.

The block diagram of the system shown in FIG. 1, and described below, illustrates an example embodiment contemplated by the present disclosure for measuring fluid consumption of process control system 4 in a normal operating mode. More specifically, the fluid consumption of the components in the process control system 4, such as a process control device 5 or a process control instrument 9, may be individually measured. To determine the quantity of supply gas to operate the process control system 4, which is generally measured in Standard Cubic Feet per Hour (SCFH), it is useful to quantify the amount of supply gas consumed by each of the process control components during normal operation. In the present disclosure, a normal fluid supply 8 and a controlled fluid supply 2 having a known volume are placed in fluid communication with fluid control system 6. The fluid control system 6 is in further communication with a process control system 4 comprising at least a process control instrument 9 operatively coupled to a process control device 5 such as a control valve assembly including a control valve (not shown) and an actuator (not shown). It can be understood by one of ordinary skill in the art that by selectively connecting the controlled fluid supply 2 through the fluid control system 6 to the process control system 4, and operating the process control system 4 in a normal operating mode, any changes in the either pressure or the volume of fluid in the controlled fluid supply 2 may be directly related to the amount of fluid used to operate the process control system 4. That is, the changes in pressure or volume of the fluid in the controlled fluid supply can be determined from an absolute measurement resulting from a known amount or from a relative measurement resulting from an initial amount and a final amount. It can be further appreciated that the fluid control system 6 may selectively connect components of the process control system 4, such as the process control instrument 9 or the process control device 5, to the to the controlled fluid supply 2 to individually determined the amount of fluid consumed during normal operation of the process control system 4. A more detailed explanation of a fluid consumption measurement system is illustrated in FIG. 2.

Figure 2:
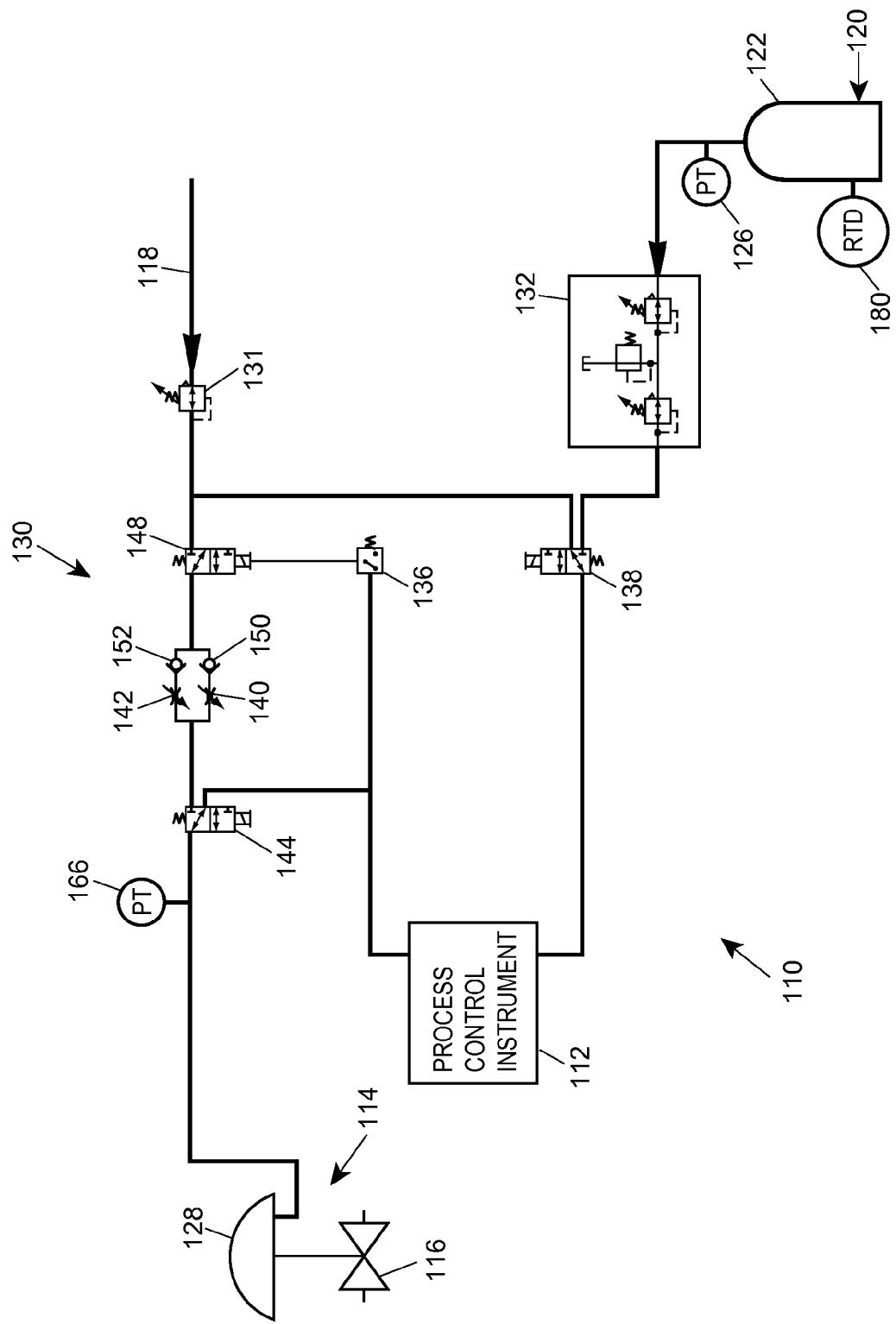
FIG. 2 is a schematic diagram illustrating a process control system equipped with an example of another embodiment of a fluid consumption measurement system contemplated by the present disclosure.

In the embodiment illustrated in FIG. 2, a process control instrument 112, such as a level controller, is shown in fluid communication with a process control device 114, comprising a control valve 116 connected to an actuator 128. Further, a controlled fluid supply 120, such as a tank 122, and an instrument fluid supply 118 are provided in selective fluid communication with a process control instrument 112 through a fluid control system 130. The fluid control system 130 includes a pressure switch 136, three solenoid valves 138, 144, 148, two check valves 150, 152, and two restrictions 140, 142. One of ordinary skill in the art can appreciate that by manipulating the fluid control system 130, the instrument fluid supply 118 and the controlled fluid supply 120 may be selectively placed in fluid communication with the process control device 114 and the process control instrument 112 to determine the amount of fluid consumed during normal operation of either component.

More particularly, the solenoid valves 138, 144, 148 of the fluid control system 130 are three-port, dual inlet solenoid valves know in the art. By activating and de-activating a each solenoid valve, its output may be selectively connected to either one of the two inputs. Therefore, in this embodiment, and the foregoing embodiments, it can be understood that the fluid pathways within the described fluid control systems can be manipulated by a human operator or an electronic interface circuit to isolate or connect the controlled fluid supplies to perform the fluid consumption measurements. For example, in the present embodiment, by activating the solenoid valve 138 with a power switch (not shown), the controlled fluid supply 120 is connected directly to the process control instrument 112 and the instrument supply 118, which may be natural gas, is disconnected from the process control instrument 112, but may remain connected to the process control device if the remaining solenoid valves 144, 148 are de-activated.

Generally, when performing a consumption measurement in the present example embodiment, the fluid flows through the fluid control system 130 from a non-bleeding adjustable pressure regulator 132, such as the Type 1367 High-Pressure Instrument Supply Regulator System manufactured by Fisher®, a division of Emerson Process Management of St. Louis, Mo. The regulator 132 is provided in series and downstream of the controlled fluid supply 120 to control the fluid supply pressure at the control valve assembly 114 and the process control instrument 112 such that its downstream pressure is substantially equal to the pressure of normal supply gas 118 controlled by the supply gas regulator 131 such as a Type 67 Regulator manufactured by Fisher®, a division of Emerson Process Management of St. Louis, Mo. Additionally, a first pressure transducer 126, such as a pressure gauge, and a temperature transducer 180, such as a Remote Temperature Detector (RTD) are provided in fluid communication with the controlled fluid supply 120 to record the pressure and temperature parameters during consumption measurements. It can be appreciated that accurate determination of temperature and pressure conditions within the tank 122 during the consumption measurements improves the accuracy of fluid consumption calculations.

One of ordinary skill in the art can further appreciate that in the present embodiment, not only can the manipulation of the fluid control system 130 be done manually, but the recording of test parameters can be also done manually. That is, the instrument and device solenoid valves 138, 144 can be activated and deactivated by switched power source to each solenoid valve 138, 144 by a human operator. Further, the temperature transducer 180 and the pressure transducers 126 and 166 can be conventional temperature sensors and pressure gauges known in the art and the temperature and pressure readings can be manually recorded for consumption calculations.

As previously described, to conduct a consumption measurement with the present embodiment, the instrument solenoid valve 138, is activated to switch the fluid source of the process control instrument 112 to the controlled fluid supply 120 of the tank 122. To compute the fluid consumed by the process control instrument 112 during operation, the pressure decrease of the fluid within the tank 122 must be measured during operation of the process control device 114 by the process control instrument 112. To mimic the normal operation of the system while performing the consumption measurement, a system of one or more adjustable pressure switches and one or more adjustable flow restrictions is provided. These adjustable pressure switches and adjustable flow restrictions are used to tune the fluid consumption measurement system 110 to mimic normal dynamic performance of the process control instrument 112 directly operating the process control device 114. That is, in a fluid consumption measurement, the output of the process control instrument 112 is disconnected from the process control device 114. Thus, the fluid consumption measurement system 110 is using the fluid control system 130 to respond to changes in the process control system to maintain normal operation during the consumption measurement. This feature will be explained in greater detail below.

Therefore, the test is initiated when the first solenoid valve 138 is activated (or otherwise set or adjusted) to a position wherein fluid is supplied to the controller 112 by the controlled fluid supply 120. At the start of a consumption measurement, an initial pressure within the tank 122 is measured and communicated by the first pressure transmitter 126 to a human operator or a processor (not shown), and recorded. The data can be recorded in a report or stored within a memory associated with the processor. As previously stated, in the present embodiment, there is no electronic test controller to initiate and control the test. In this embodiment, the processor only monitors the test and collects test parameters through electronic communication between the processor and the pressure and temperature pressure transmitter, if so connected.

As the test continues, the second solenoid valve 144 is activated to a position wherein fluid is supplied by the instrument fluid supply 118 to the control valve 116 and to the actuator 128 in operable communication with the control valve 116. The pressure switch 136 provides the control function of the present embodiment. That is, when the output pressure signal from the process control instrument 112 deviates from a preset value or set point of the pressure switch 136, the pressure switch 136 creates an electric signal to actuate the supply solenoid 148 to manipulate the fluid supply to the control valve assembly 114 to maintain normal operation during the test. The fluid control system 130 maintains normal operating characteristics by mimicking the dynamic of the process control system in a normal operating mode by providing adjustable flow restrictions in the flow path. That is, one of ordinary skill in the art appreciates the process control system will have a specific dynamic characteristics that must be maintained to ensure consumption measurement accuracy.

It can be further understood that the adjustable flow restrictions 140, 142 provide the test operator with the facilities to adjust the dynamic of the test system to correspond with equivalent dynamics of the process control system during operation. Therefore, the adjustable flow restrictions 140, 142 are provided in fluid communication with the instrument fluid supply 118 the drives the process control device 114 when the process control instrument 112 has been disconnected for a consumption measurement.

Additionally, a first unidirectional check valve 150 may be provided at an inlet of one of the flow restrictions 140 to prevent backflow through the flow restriction 140, and a second unidirectional check valve 152 may be provided at an outlet of one of the flow restrictions 142 to prevent backflow through the flow restriction 142. Thus, while the test is running, the process control system maintains operation. If after a predetermined time period, the operator determines the test has finished running, the first pressure transmitter 126 detects a final tank pressure and the temperature transmitter 180 detects a final tank temperature data. The pressure, temperature, and elapsed time data are recorded. To calculate consumption, an algorithm executed by the processor subtracts the final tank pressure of the tank 122 from the initial pressure of the tank 122, and may be temperature compensated with the recorded temperature data, to determine the pressure decrease within the tank 122.

This calculated pressure decrease within the tank 122 is converted using predetermined pressure-to-volume correlations to determine the quantity of fluid from the tank consumed by the controller during the predetermined time period. Because the fluid measurement is based on depletion of pressure within the tank 122, any leakage within the process control system 110 will also be captured. The measured performance is a reflection of a worst-case result, accounting for leakage in the control valve 116 as well as leaks in tubing, piping, or other plumbing within the process control system iii. This is preferable to measuring exhaust of the controller 112, wherein any system leakage would go undetected in the emission measurement. One of ordinary skill in the art can appreciate that the fluid consumption measurement system can also be automated.

Figure 3:
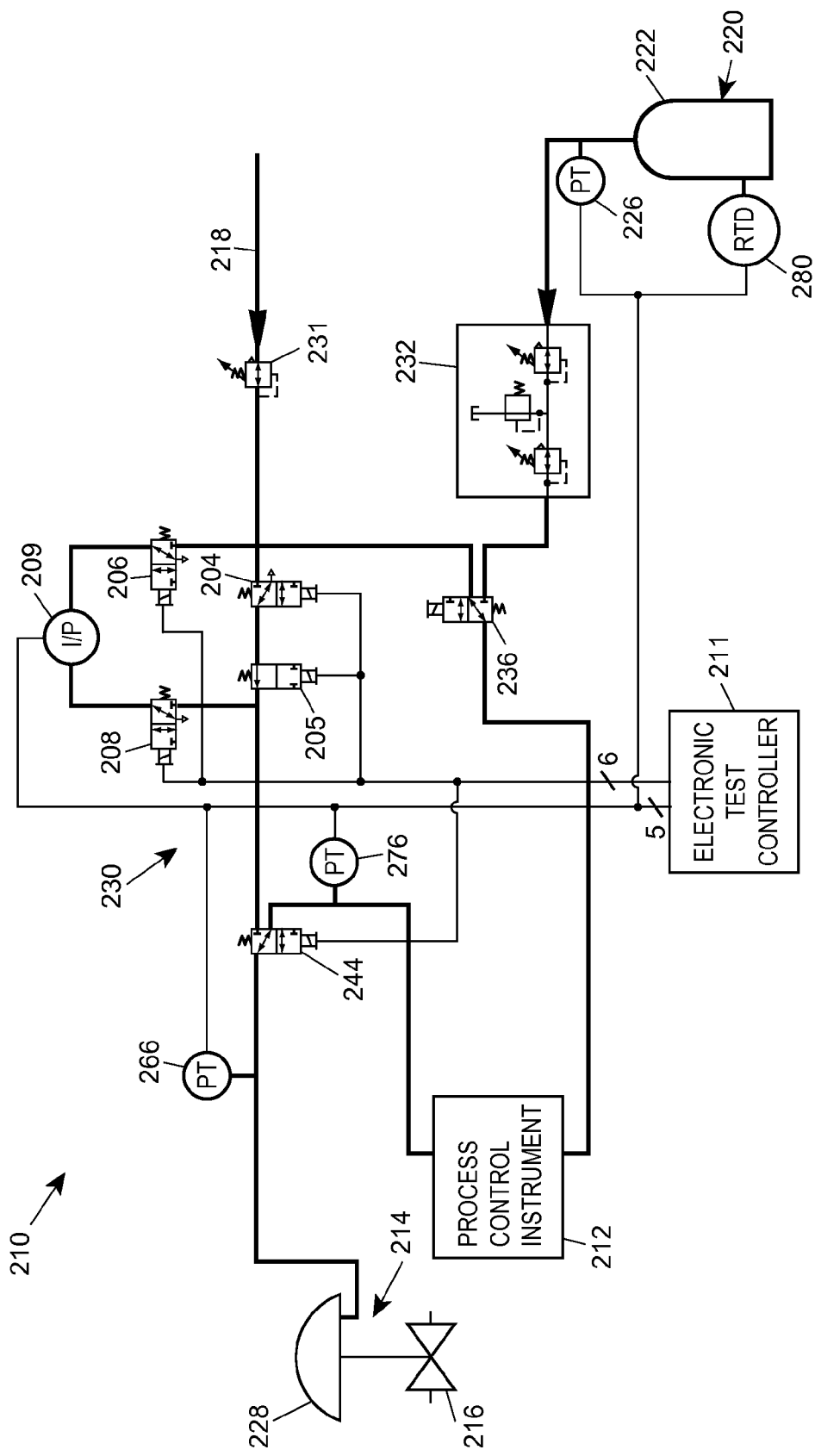
FIG. 3 is a schematic diagram illustrating a process control system with an embodiment of a fluid consumption measurement system contemplated by the present disclosure.

Turning to the system shown in FIG. 3, another example contemplated by the present disclosure is shown. The fluid consumption measurement system 210 consists of a controlled fluid supply 220 and an instrument fluid supply 218 being controlled by a fluid control system 230. In the example embodiment, the process control system shown includes at least a process control instrument 212, such as a level controller, and a process control device 214, such as a control valve assembly, comprising an actuator 228 and a control valve 216. In normal operation, the process control device 214 responds to pneumatic command signals from the process control instrument 212 to control flow through the control valve 216. Commonly, this is accomplished by controlling a source of pressurized fluid or a supply gas to actuate the control valve 216 in response to an input signal to the process control instrument 212 from a process controller (not shown). In the present embodiment, the primary source of the supply gas is through the instrument fluid supply 218, as shown, supplied at a substantially constant pressure through a supply gas regulator 231. To determine fluid consumption, the instrument fluid supply 218 is temporarily replaced by the controlled fluid supply 220, such as fluid provided in a tank 222 or other vessel. Using an alternative fluid source to identify and quantify the supply gas consumed or used by the system will be described in greater detail below. More particularly, the system depicted in FIG. 3, can be used for measuring fluid consumption of pneumatic devices having either proportional, i.e., substantially continuous throttling outputs, or discrete, i.e. "on" or "off" or substantially intermittent, outputs.

As shown, a controlled fluid supply 220, such as a tank 222, is provided in selective fluid communication with at least the process control instrument 212. The tank 222 is in fluid communication with the process control instrument 212 through a non-bleeding adjustable pressure regulator 232, such as the Type 1367 previously described. Similar to the embodiment described within FIG. 2, the regulator 232 is provided in series and downstream or at the outlet of the controlled fluid supply 220 to control the fluid supply pressure at the control valve assembly 214 such that the downstream pressure is substantially equal to the pressure of instrument supply gas 218 downstream of the supply gas regulator 231. Controlled fluid test parameters, such as fluid pressure and fluid temperature, are detected by a first pressure transmitter 226 and a temperature transmitter 280 that are in fluid communication with the controlled fluid supply 220.

As contemplated by this disclosure, the temperature transmitter 280 provides data to indicate the average temperature of fluid within the controlled fluid supply 220. Average temperature readings detected by the temperature transmitter can be used in calculating the amount of fluid within the controlled fluid supply 220 at any given time. The first pressure transmitter 226 provides pressure data related to the fluid pressure within the tank 222.

In the present embodiment, a first solenoid valve 238 in the fluid control system 230, such as a three-port valve having dual inlets, provides selective control of the fluid source to the process control instrument 212. The first solenoid valve 238 is positioned at the outlet of the regulator 232 and is in fluid communication with the instrument fluid supply 218 and tank 222 through the regulator 232. When activated, the first solenoid valve 238 switches the fluid source to the process control instrument 212 from an instrument fluid supply 218, such as a natural gas supply, to the controlled fluid supply 220 of the tank 222. The fluid control system 230 includes a second pressure transmitter 276 in communication with an output of the process control instrument 212 to measure the output signal from the process control instrument 212 during the fluid consumption measurement. The fluid control system 230 also includes a second solenoid valve 244, substantially similar to the first solenoid valve 238, in fluid communication with the output of the process control instrument 212 and a third pressure transmitter 266 is provided at the output of the second solenoid valve 244.

When these components of the fluid control system 230 are activated, the second solenoid valve 244 switches the fluid source from an output of the process control instrument 212, to the instrument fluid supply 218, disconnecting the process control instrument 212 from the process control device 214 to isolate the instrument supply gas from the device supply gas to allow accurate discrimination of the fluid consumed during operation of the process control loop. To reproduce normal operation during a consumption measurement, the fluid control system 230 must supply a pneumatic control signal to the actuator that mimics the control signal from the process control instrument 212. This control signal is reproduced within the fluid control system through a fluid bridge circuit formed from four solenoid valves 204, 205, 206, 208 and a current-to-pressure ("I/P") transducer 209. The fluid bridge circuit creates a fluid circuit that permits the fluid consumption measurement system 210 to be used with either a throttling or a discrete process control devices as explained in greater detail below. That is, the fluid bridge circuit creates a selectable fluid flow path positioned between the outlet of the supply gas regulator 231 and inlet of the second solenoid valve 244.

The present embodiment further includes an electronic test controller 211, such as a programmable logic controller having a associated processor, memory, and discrete inputs and outputs, coupled to the pressure transmitters 226, 266, 276, the solenoid valves 238, 244, 204, 205, 206, 208, the current-to-pressure transducer 212, and the temperature transmitter 280 to operate the fluid consumption measurement system 210. As described below, the electronic test controller 11 can provide multiple operational modes of the fluid control system 230. For example, in a normal operational mode, the electronic test controller 211 manipulates the fluid control system 230 to place the process control instrument 212 pneumatic control signal directly in control of the process control device 214. In another mode, a fluid consumption measurement mode, the electronic test controller 212 manipulates the fluid control system to disconnect output of the process control instrument 212 from the control valve assembly 214 and the electronic test controller 211 assumes control of the process control device 214 through the fluid control system 230 to isolate the process control instrument 212 to determine fluid consumption. Additionally, the electronic test controller 211 may use signals from the pressure transmitters 226, 266, 276 of the fluid control systems to characterize the normal operating mode of the process control system for diagnostic purposes or to determine faults within the test system in a diagnostic mode.

Figure 4:
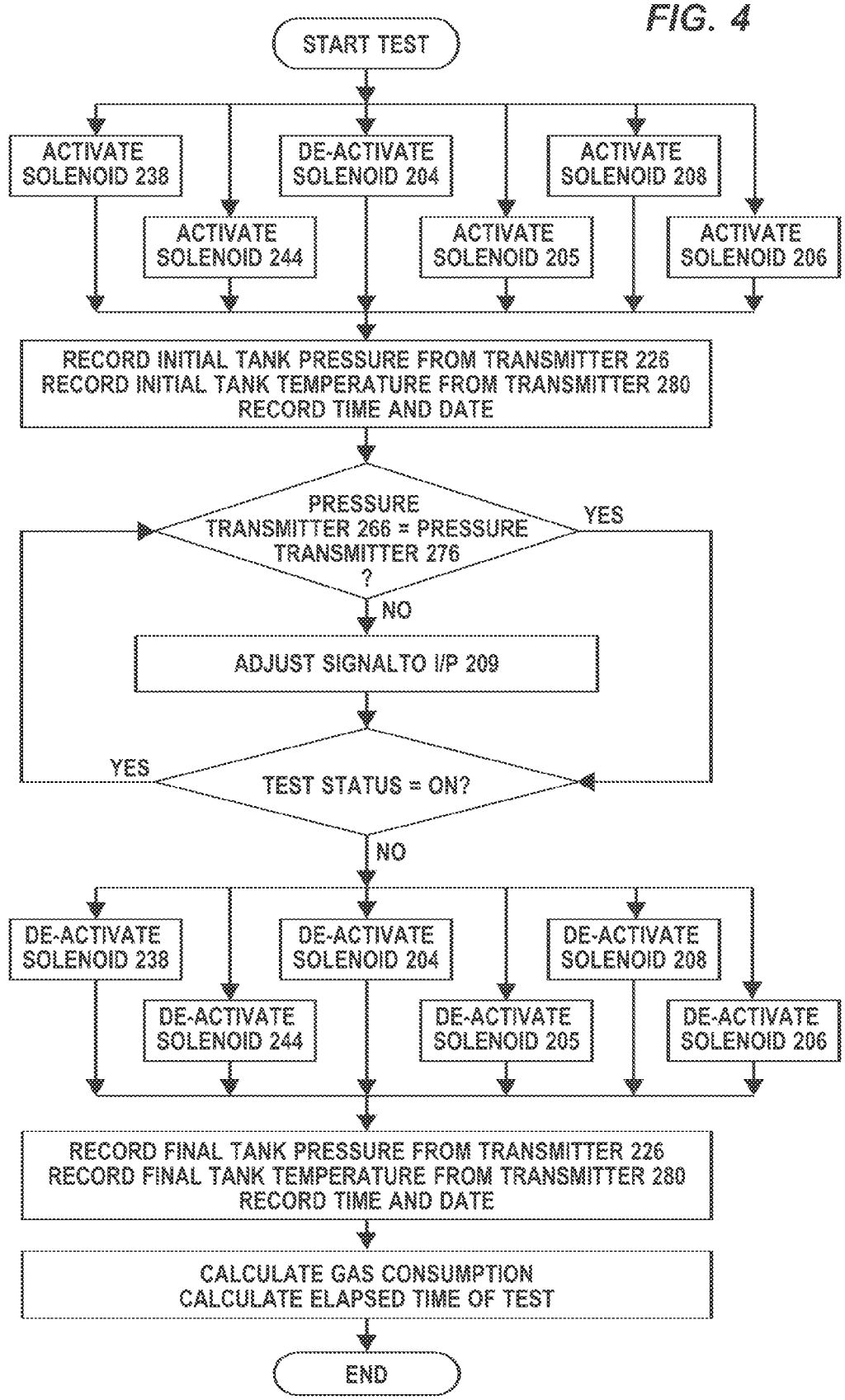
FIG. 4 is a logic flow chart describing the operational steps of the fluid consumption measurement system of FIG. 3 when used in the testing of fluid consumption by devices having proportional, i.e. throttling, outputs.

Turning to the flow chart in FIG. 4, the logic described in the flow chart explains how the fluid consumption measurement system 210 is used in combination with a process control instrument 212 that operates as a throttling device to conduct a fluid consumption measurement. At the initiation of the test, the first, second, fourth, fifth, and sixth solenoid-valves, 238, 244, 205, 208, 206 are activated and the third solenoid valve 204 is de-activated to route the normal instrument fluid supply 218 through the current-to-pressure transducer 209 to the second solenoid valve 244. When fluid test consumption system 210 is used with a throttling-type or continuous-output process control instrument, the current-to-pressure transducer 209, provides a substantially continuous control, signal to the process control device 214 to replicate a normal operating mode of the process control system by mimicking the output of the process control instrument 212. It should be understood that the fifth solenoid valve 205 of the fluid control system 230 blocks the outlet of I/P 212 from venting through the third solenoid valve 204 during operation thereby directing the fluid flow through the current-to-pressure loop to actuate the control valve assembly 214. Thus, by manipulating the fluid control system 230 as previously described, the fluid consumption measurement system 210 has the fluid sources to the process control instrument 212 and the process control device 214 isolated to permit accurate discrimination of the fluid consumed by the process control instrument 212 during normal operation of the process control system.

Continuing in FIG. 4, the next step of the consumption measurement requires that an initial tank pressure and temperature is detected by the first pressure transmitter 226 and the temperature transmitter 280 and communicated to the electronic test controller 211. The initial tank pressure and temperature data may be recorded, such as by storing the data in a memory associated with the processor in the electronic test controller 211. The commencement time of the fluid consumption measurement is also recorded, such as by storing the time and date the fluid consumption measurement began in the memory associated with the processor as well.

As the consumption measurement continues operation, the output signal from the process control instrument 212 is detected by the second pressure transmitter 276 and communicated to the electronic test controller 211. Additionally, the third pressure transmitter 266 detects fluid pressure at the outlet of the second solenoid valve 244, and communicates data corresponding to that pressure to the electronic test controller 211. One skilled in the art can appreciate that the conditional test and iterative loop described in FIG. 4 demonstrate that the electronic test controller is performing closed-loop control of the process control device 214 during the fluid consumption measurement with the process control instrument 212 no longer in direct communication with the process control device 214. That is, the electronic test controller 211 iteratively compares the data received from the second pressure transmitter 276 to the data received from the third pressure transmitter 266 in a closed-loop manner to control the consumption measurement.

For example, in order to maintain control of the process control device 214 during the consumption measurement, the electronic test controller 211 determines if there is a difference between the pressure detected by the second pressure transmitter 276 (i.e., the fluid pressure at the output of the process control instrument 212), and the pressure detected by the third pressure transmitter 266 (i.e., the fluid pressure at the outlet of the second solenoid valve 244) a correction or adjustment to the pneumatic control signal supplied through the current-to-pressure transducer 209 should be made. Thus, if a difference or error is detected, the electronic test controller 211 adjusts an electronic signal sent to the current-to-pressure transducer 212 to maintain operation of the valve 216 while measuring the consumption of the process control instrument 212. In the next step, the electronic test controller 211 conducts a check to determine if the pre-determine time of the electronic test controller 211 has expired indicating whether or not the consumption measurement is still running (i.e. test status "on"). If the test is still executing, the processor again compares the data received from the second and third pressure transmitters 266, 276 to continue control of the process. This action continues until pre-determined time expires and the electronic test controller 211 completes the consumption measurement.

When the electronic test controller 211 determines the test is complete (i.e. test status="off"), all of the solenoid valves 238, 244, 204, 205, 206, and 208 are de-activated. This action places the normal instrument supply 218 in direct communication with the process control instrument 212 and the output of the process control instrument 212 is directly connected to the process control device 214. These connections place the process control system in a normal operating mode and the fluid consumption measurement system 210 is effectively disconnected from the process control loop. To complete the consumption measurement, the first pressure transmitter 226 detects a final tank pressure, the temperature transmitter 280 detects a final tank temperature, and both measurements are communicated and recorded by the electronic test controller 211 along with the conclusion time of the test.

Upon completion of the test, the electronic test controller 211 calculates the fluid consumption of the process control instrument 212 based upon the initial and final tank pressure, and the elapsed time of the test with additional corrections based upon the temperature of the supply gas collected during the consumption measurement. To enhance the accuracy of the measurement, the consumption calculations account for the quantity of gas situated between the output of process control instrument 212, the second pressure transmitter 276, the solenoid valve 244, and the conduit or tubing connected therebetween. The volume of the solenoid valve passageway, the tubing, and the pressure transmitter passageway, being predetermined and substantially constant, is removed from the consumption calculations through arithmetic subtraction. One of ordinary skill in the art can appreciate that during the consumption measurement, the solenoid valve 244 is activated closing the fluid passageway between the process control instrument 212 and the actuator 228, effectively "dead heading" the connection thereby eliminating the need to compute instantaneous volume of the actuator during measurement to determine the quantity of gas consumed by the process control instrument 212 during actual operation of the valve 216.

It should be further appreciated that in a concurrently operating diagnostic mode, either the second pressure transmitter 276 and/or the third pressure transmitter 266 may be used to indicate the performance of the test system 210. For example, a signal from the third pressure transmitter 266 may be used as a fault signal to indicate a blockage or failure of any of the pneumatic instruments of the fluid consumption measurement system 210. Additionally, a signal from the second pressure transmitter 276 may be used independently or in conjunction with the signal from the third pressure transmitter 266 as a fault signal. An exemplary use of the independent signal may include processing the signal with time-based measurement to indicate the fault status of the process control instrument 212 being tested. The signal from the second pressure transmitter 276 may also be used in conjunction with the signal from the third pressure transmitter 266 to isolate failures within the fluid consumption measurement system 210 due to separation of the flow paths between the two pressure transmitters within the fluid consumption measurement system 210. Most significantly, the continual monitoring of the pressure signals for the pressure transmitters, 226, 266, and 276, and the default states of the solenoids, 238, 244, 204, 205, 206, and 208 permit the electronic test controller 211 to abort a consumption measurement in the event of test system failure and return the process control loop to a normal operating mode without disturbing the process control system operation.

Figure 5:
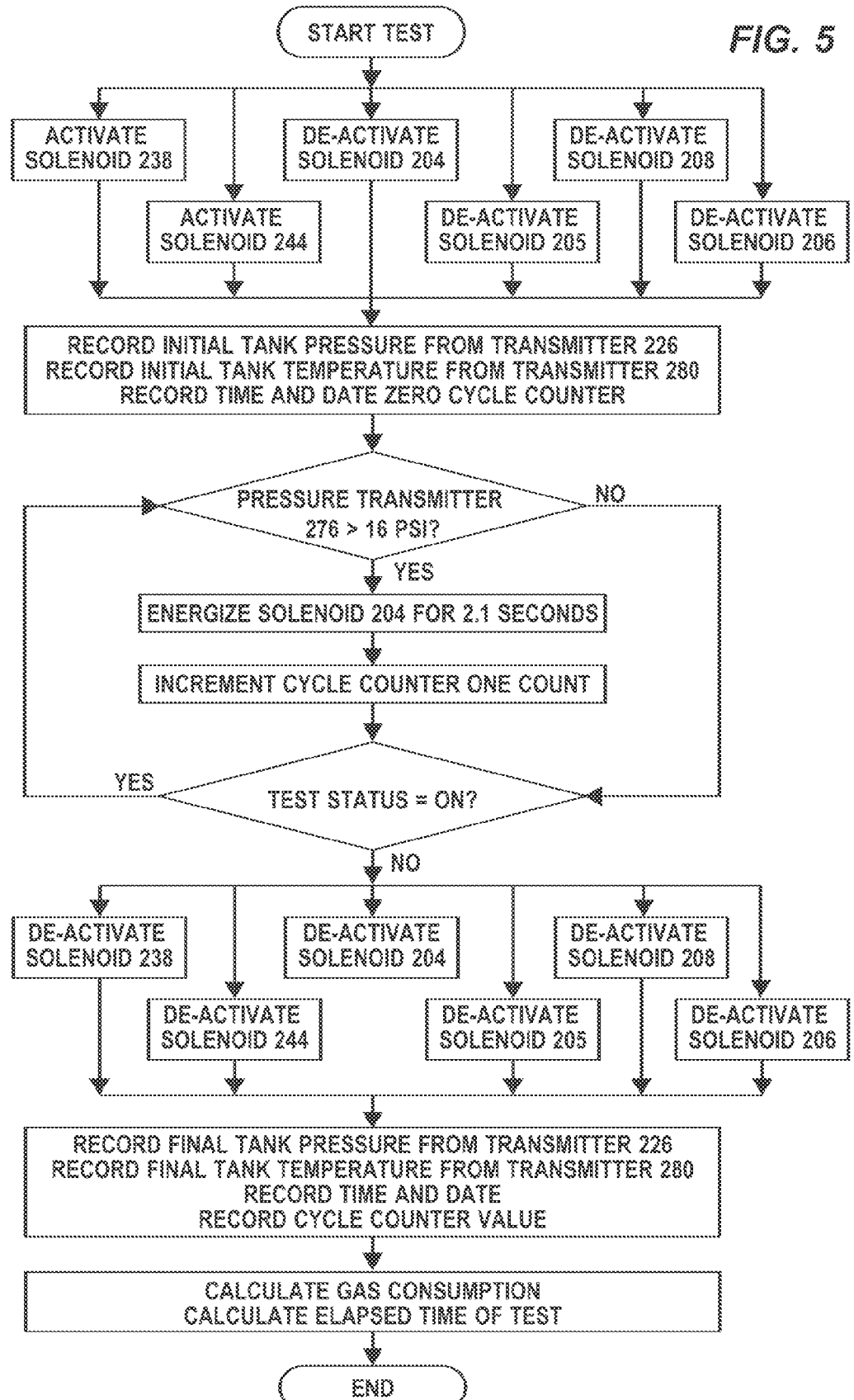
FIG. 5 is a logic flow chart describing the operational steps of the fluid consumption measurement system of FIG. 3 when used in the testing of fluid consumption by devices having discrete, i.e. "on" or "off," outputs.

Turning to FIG. 5, and referring to FIG. 3, the control logic for measuring fluid consumption by a process control instrument having a discrete (i.e. "on" or "off") output is illustrated. In a first step, the first solenoid valve 238 and second solenoid valve 244 of the fluid control system 230 are activated, and the remaining solenoid valves 204, 205, 206, and 208 are de-activated to remove the current-to-pressure device 210 from the fluid path thereby directing the instrument fluid supply 218 exclusively to the inlet of the third solenoid valve 204. It should be understood that during the consumption measurement for a process control instrument having a discrete output, the process control device 214 is controlled by intermittent connections to the supply gas.

At the start of the test, an initial tank pressure data, an initial tank temperature data, an initial or commencement time is communicated to the electronic test controller 211. Additionally, a cycle counter may be implemented within the control loop of the electronic test controller 211. It can be understood that the cycle counter may be indicative of the number of cycles a pneumatic control instrument, for example, the total number of "dump" cycles in a process control system including a level controller (e.g. when fluid is expelled from tank whose level is being controlled), executes during the operation of the fluid consumption measurement. This data will permit test operators to normalize the fluid consumption calculations over the duration of the test which may be useful in comparing consumption data for different types of pneumatic control devices (i.e. determine the amount of fluid consumed per dump cycle). As such, the cycle counter is zeroed (i.e. set to zero) at the start of each test.

Next, data corresponding to fluid pressure at the outlet of the process control instrument 212, detected by the second pressure transmitter 276 and communicated to the electronic test controller 211, is compared to a value corresponding to a predetermined control pressure, such as 16 psi. To maintain control of the process control system during the test, the electronic test controller 211 makes a conditional test to determine if the fluid pressure at the outlet of the process control instrument 212 has deviated from the predetermined pressure. For example if the detected pressure is lower than the threshold, the third solenoid valve 204 is activated for a predetermined period of time, such as 2.1 seconds, to supply actuator pressure to the actuator 228 to move the valve control element (not shown). The predetermined pressure, for example 16 psig, and the predetermined time period or dwell time are preferably selected to mimic the normal operation of the process control instrument 212 as characterized by the electronic controller 211 as previously described. In the next step, the cycle counter is incremented by one count. The processor then conducts a check to confirm whether the consumption measurement is still running, and if the test is still running, the electronic test controller 211 continues to exercise the control loop by iteratively comparing the data transmitted by the second pressure transmitter 276, corresponding to fluid pressure at the outlet of the process control instrument 212, to the predetermined pressure and issuing pressure signal commands to maintain control until the test completes.

Upon conclusion of the consumption measurement, all solenoid valves 238, 244, 204, 205, 206, and 208 are de-activated to return the process control system normal operation wherein the process control instrument 212 is directly connected to the process control device 212 and the instrument supply 218 is connected to the process control system. A final tank pressure, a final tank temperature, the cycle count, and the conclusion time of the consumption measurement are recorded by the electronic test controller 211. The electronic test controller 211 then uses the initial and final tank pressure, the elapsed time of the test and temperature data to calculate fluid consumption by the process control instrument 212. For example, after a predetermined period of time of normal operation of the process control system, the final measured pressure of the tank 222 is subtracted from the initial pressure of the tank 222 to determine the pressure decrease within the tank 222. It is understood that the pressure decrease over a fixed time period is substantially proportional to total fluid expended from the tank or consumed during the operation of the process control components. The recorded temperature data is used to adjust the pressure measurements based prior to consumption calculations. Subsequently, the processor within the electronic test controller 211 may calculate the total fluid consumption and calculates the elapsed time of the test, and provides the data in a usable format, such as in a test report.

Figure 6:
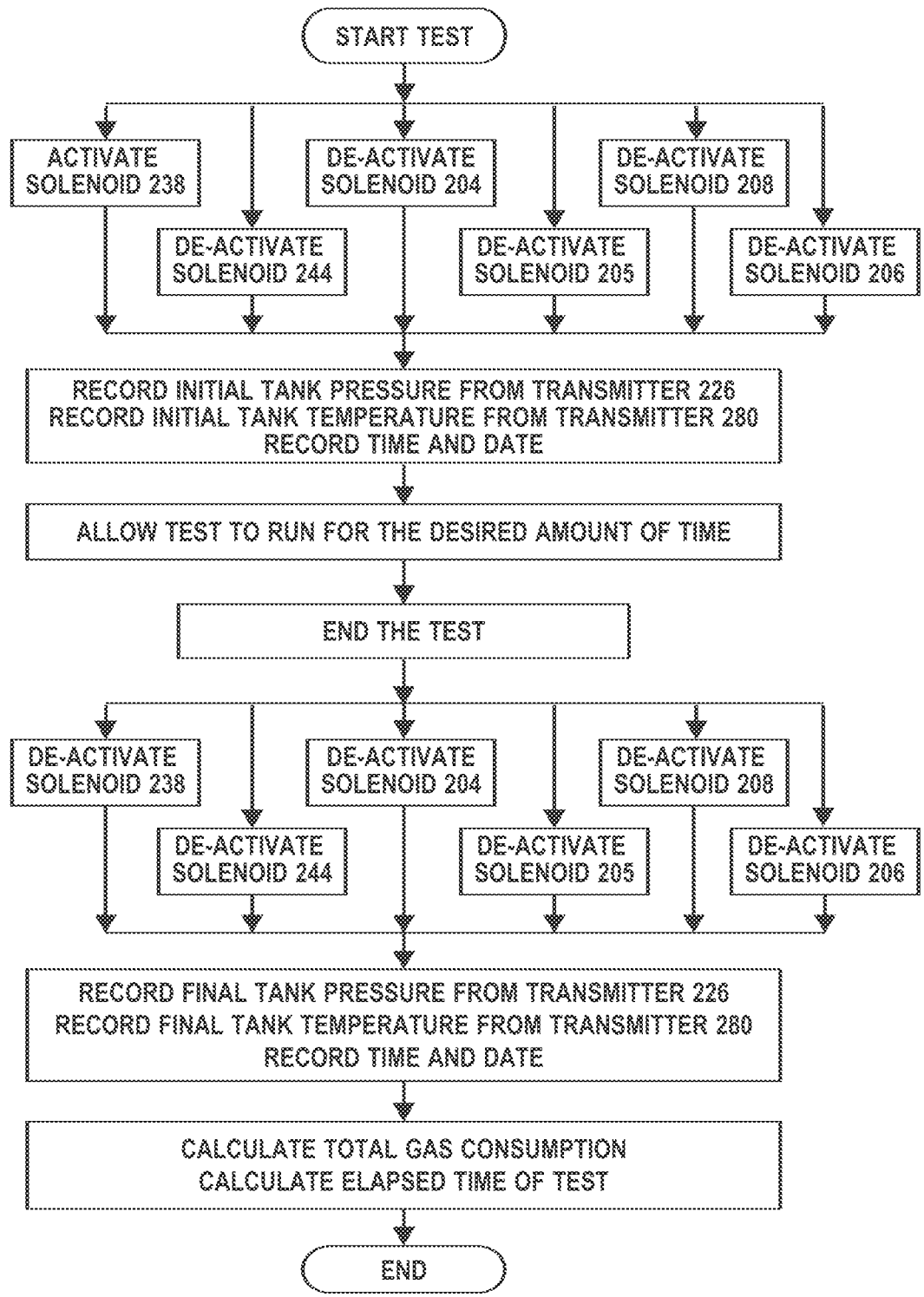
FIG. 6 is a logic flow chart describing the operational steps of the fluid consumption measurement system of FIG. 3 when used in the testing of the total fluid consumption by a process control system.

Because the fluid measurement is based on depletion of pressure within the tank 222, any leakage within the process control system 210 will be captured. The measured performance is a reflection of a worst-case result, accounting for leakage in the control valve 216 as well as leaks in tubing, piping, or other plumbing within the process control system 210. This is preferable to measuring exhaust of the process control instrument 212, wherein any system leakage would go undetected in the emission measurement. As previously described, by manipulating the various solenoid valves in the embodiment of the fluid consumption measurement system 210 of FIG. 3, one can measure consumption of a particular pneumatic device within a control loop. Additionally, alternating, the operating sequence of the solenoid valves can provide a consumption measurement of the entire control loop. FIG. 6 is used to illustrate the operational logic of used by the electronic test controller 211 in exercise of the fluid consumption measurement system shown in FIG. 3 to measure the total consumption of the process control instrument 212 and the process control device 214.

Accordingly, at the initiation of the total fluid consumption measurement, the first solenoid valve 238 is activated and the remaining solenoid valves 244, 204, 205, 206 and 208 are de-activated, which directs fluid pressure from supply tank 222 through the process control instrument 212 to the process control device 214 in a test mode that mimics the normal operating mode (i.e. the output from the pneumatic control instrument 212 is in direct fluid communication with the actuator 228). At least one initial tank pressure reading is communicated by the first pressure transmitter 226 to the electronic test controller 211. The temperature transmitter 280 detects an initial temperature within the tank 222, and that initial temperature data is also transmitted to the processor. The initial tank pressure and temperature data are recorded, such as by storing the data in a memory associated with the processor. The elapsed time of the fluid consumption measurement is also recorded in the memory associated with the processor. Finally, all of the solenoid valves 238, 244, 204, 205, 206, 208 are de-activated returning the process control system to a normal operating mode.

A final tank pressure reading is communicated by the first pressure transmitter 226 to the electronic test controller 211, as previously described. In addition, a final measurement from temperature transmitter 280 is communicated to the electronic test controller 211. The final tank pressure, temperature data, the elapsed time of the total fluid consumption measurement are again recorded by storing the data in a memory associated with the processor. As previously discussed, the change in pressure with respect to the total consumption measurement time, in view of the temperature data, provides a measure of the total supply gas consumed by the pneumatic control instrument 212 and the control valve assembly 214.

It can be further appreciated that the fluid consumption measurement system 210 can be entirely or substantially self-contained. The control valve assembly 214, such as a control valve 216 and actuator 228, the process control instrument 212 and an instrument fluid supply 218 may all be stationary and fluid consumption measurement system 210 may be a mobile test system. That is, the fluid consumption measurement system 210 may be packaged in a compact, portable arrangement that may be easily transported to the site of the process control system, such as at a well site or a particular location within a process control plant. To facilitate transportation of the fluid consumption measurement system such equipment may be stationed on a mobile trailer, pallet, or skid (not shown). In mobile applications, the controlled fluid supply 220 and the fluid controlled system 230 may be packaged in a compact, portable arrangement that may be easily transported to the site of the process control system and powered by a generator or other alternate power source to operate a compressor (not shown) to fill the tank 222 or recharge one or more batteries used to power electronics of the system and/or to power the solenoid valves 238, 244, 204, 205, 206, 208. Alternatively, the tank 222 could be filled with compressed air by way of a compressor powered, for example, by a gasoline-powered generator.

The various embodiments disclosed herein are not limited to measuring fluid consumption or emissions of process control systems having controllers and control valves. The systems and methods disclosed herein could be used to measure fluid consumption of a multitude of fluid operated field devices. For instance, in addition to controllers, the systems and methods described herein can be employed to measure the gas consumption of pneumatically-operated pumps, transducers, switches, and the like.

The systems and methods contemplated by this disclosure may also be configured to measure consumption of multiple devices simultaneously. For instance, a multiple of tanks or other vessels may be provided for each device in a process control system to measure the individual fluid consumption during normal operation A fluid consumption measurement system for multiple devices may prove to be particularly advantageous. For example, by monitoring the relative consumption of controlled fluid supply for each of the device under different modes of operation or under different tuning parameters, the consumption of an entire process could be determined. Such an implementation of the fluid consumption measurement system may provide data to allow process control loop tuning to minimize gas consumption within the process control system.

Figure 7:
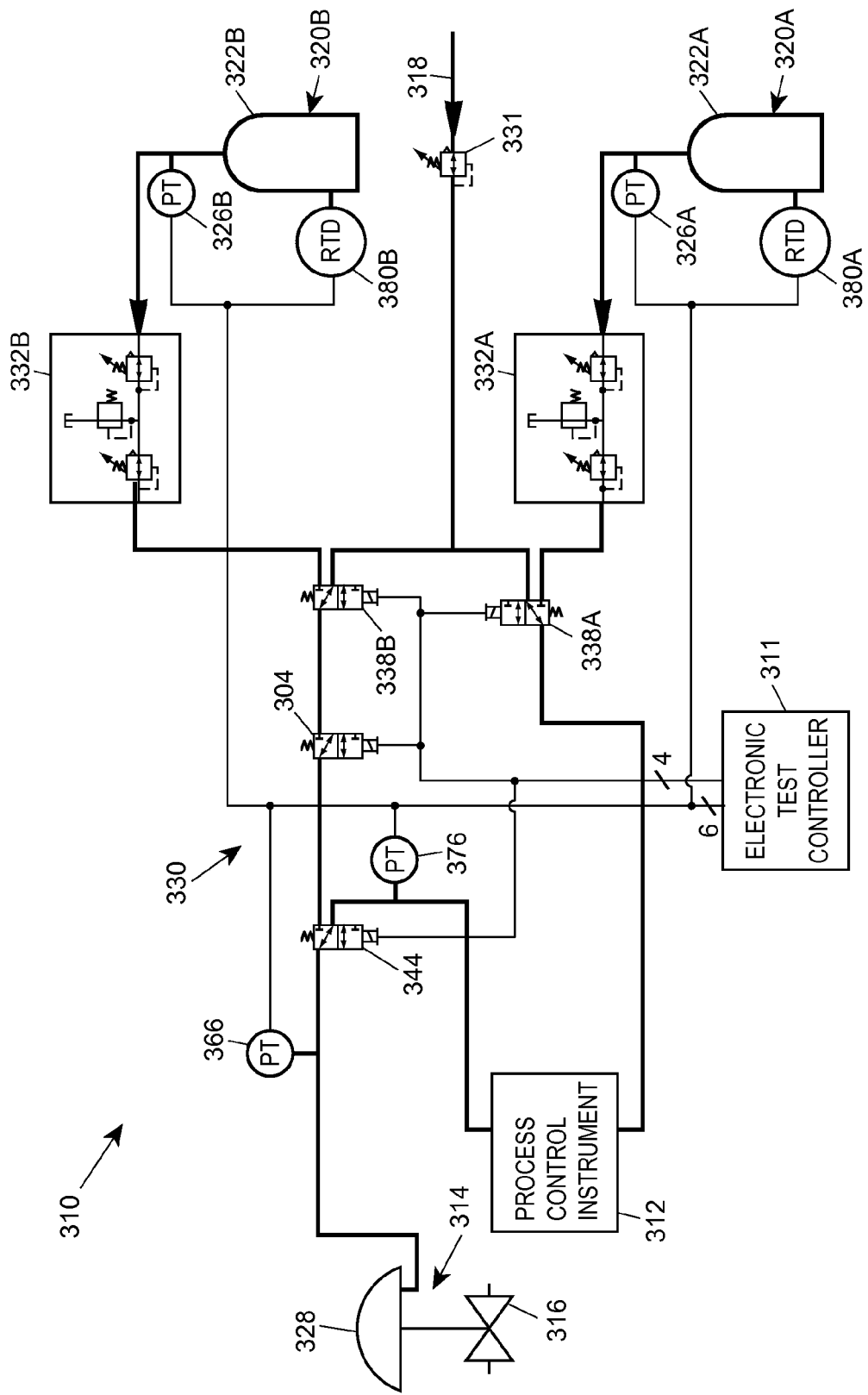
FIG. 7 is a schematic diagram of a process control system illustrating a further example of a fluid consumption measurement system contemplated by the present disclosure.
Figure 8:
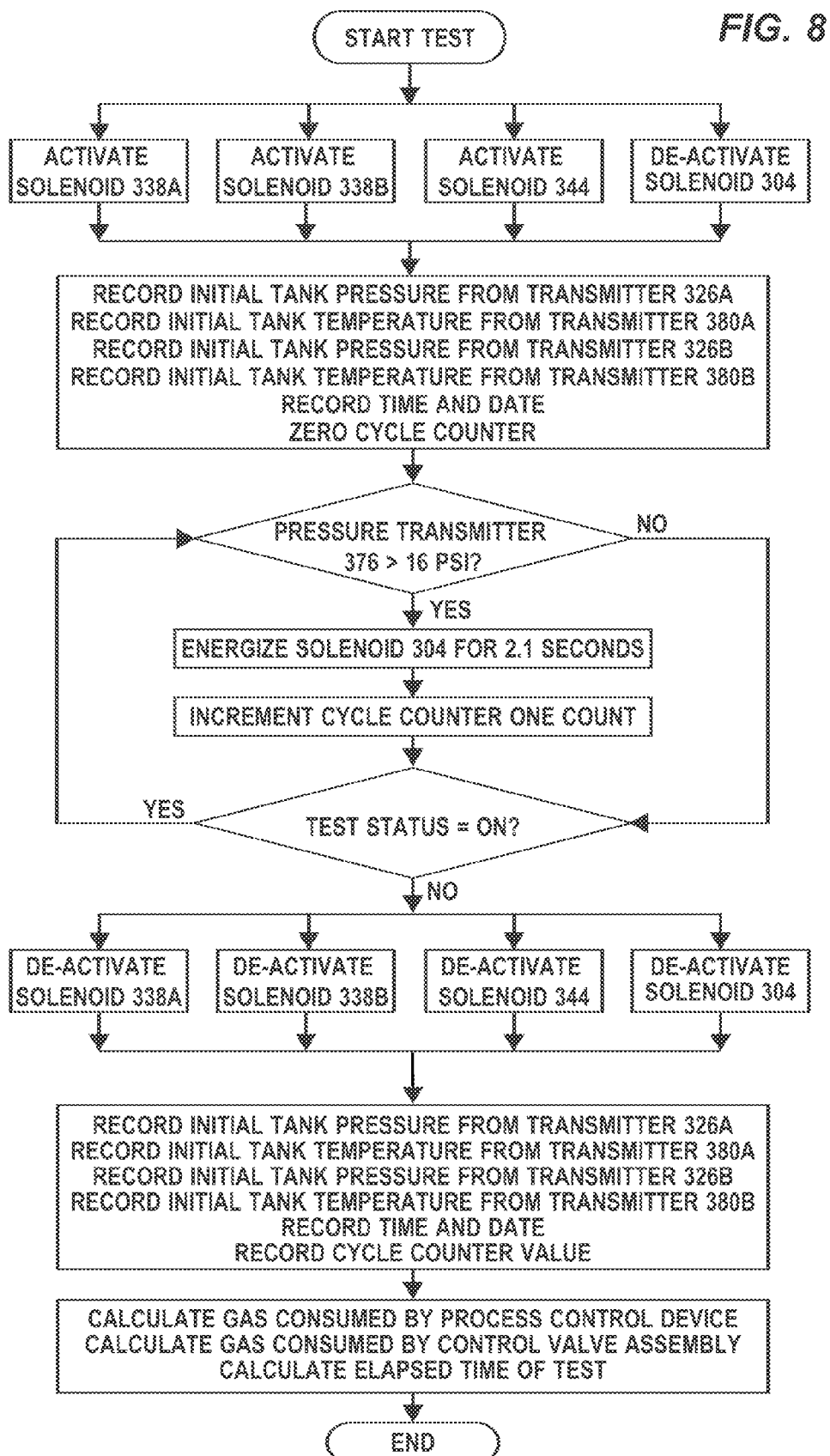
FIG. 8 is a logic flow chart describing the operational steps of a fluid consumption measurement system to determine the individual fluid consumption of pneumatic components within the process control system shown in FIG. 7.

More specifically, FIG. 7 and FIG. 8 illustrate such a system and describe the control logic to accurately measure the individual fluid consumption of all the pneumatic components of a process control system consisting of a control valve assembly 314 and an "on-off" process control device 312. In FIG. 7, a fluid consumption measurement system 310 is shown incorporating two controlled fluid supplies 320A, 320B supplied from two tanks 322A, 322B. In the present embodiment, outlet pressure of the controlled fluid supplies 320A, 320B are separately controlled by non-bleeding adjustable pressure regulators 332A, 332B are provided in series connection at the output of the tanks 322A, 322B, respectively. As previously described, the pressure regulators 332A, 332B ensure that the output pressure is substantially equal to the pressure of instrument supply gas 318 at the supply gas regulator 331 normally used to provide supply gas to the process control loop.

The present embodiment also includes pressure transmitters 326A, 326B and temperature transmitters 380A, 380B in direct communication with each controlled fluid supplies 320A, 320B to record the test parameters, as previously discussed, to calculate the fluid consumed in a normal operating mode. Additionally, two supply solenoid valves 338A, 338B, such as three-port valves having a dual inlets, place each controlled fluid supply 320A, 320B and an instrument fluid supply 318 in selective communication with the process control device 312 and the control valve assembly 314, respectively, to control the fluid supply source to each component in the process control system.

The inlet of a third solenoid valve 344, another three-port, dual position valve is provided in fluid communication with the outlet of the process control instrument 312 to direct the pneumatic outlet signal from the process control instrument 312 to the process control device 314. During a fluid consumption measurement, the third solenoid valve 344 disconnects the output signal of the process control instrument 312 from the process control device 314. Thus, when activated, the third solenoid valve 344 switches from a position in which fluid is supplied to the control valve assembly 314 from an outlet of the process control instrument 312, to a position in which fluid is indirectly supplied to the control valve assembly 314 from the second alternate fluid supply 320B.

As previously described, an electronic test controller 311 records an output signal from the pressure transmitter 376 during a normal operating mode and controls the supply pressure to the actuator through the remaining fluid control system 330, as described in greater detail below, to mimic normal operation of the process control loop during the test. In the event of a fluid consumption measurement system failure, the entire fluid control system will resume a default mode wherein all of the solenoid valves assume a deactivated state to place the instrument fluid supply 318 and the process control instrument 312 in direct communication with the process control device 314 for normal operation. As shown in FIG. 7, an electronic test controller 311 is operatively coupled to the pressure transmitters 326, 366, 376, the solenoid valves 338A, 338B, 304, 344, and the temperature transmitters 380A, 380B to operate the fluid consumption measurement system 310.

Similarly described above, the electronic test controller 311 may provide multiple operational modes. For example, in a normal operational mode the process control instrument 312 provides the pneumatic control signal directly to the control valve assembly 314. In a test mode, the electronic test controller 311 may detect the control signal from the process control instrument 312 through a pressure transmitter 376 and supply the pneumatic control signal to the process control device through a flow path independent from the process control instrument 312. The electronic test controller 311 may use signals from a plurality of pressure transmitters-326, 366, 376 to characterize the normal operating mode of the process control system or for diagnostic purposes to determine faults within the test system. For example, during a normal operating mode, specific control signals to the process control instrument 312 would provide specific pneumatic output signals to the process control device 314. This data could be recorded and used to optimally tuned the process control loop for fluid supply consumption. Alternatively, deviation from expected values may be indicative of faults in either the process control system or the fluid consumption measurement system 310.

Turning to FIG. 8, the control logic for fluid consumption measurement system 310 for the measurement of fluid consumption by the process control system comprised of a control valve assembly 314 and a process control device 312 having a discrete (i.e. "on" or "off") outlet is illustrated. In a first step, the supply solenoid valves 338A, 338B and outlet solenoid valve 344 are activated and the control solenoid valves 304 is de-activated, thereby directing the controlled fluid supplies 320A, 320B to the process control device 312 and the control valve assembly 314, respectively.

Initial tank pressure data from the pressure transmitters 326A, 326B, an initial tank temperature data are detected by the temperature transmitters 380A, 380B and the commencement time of the consumption measurement are all recorded by the electronic test controller 311, as previously described. Again, a cycle counter may be implemented within the electronic test controller 311 to counter the total number of "dump" cycles during the test. The counter is generally "zeroed" at the start of the test and incremented with each cycle of the test until the test is complete.

The fluid consumption measurement commences in a manner substantially similar to the embodiment described in FIG. 2 and FIG. 4 for an "on-off" process control instrument. That is, under control of the electronic test controller 311, the control pressure detected by the device pressure transmitter 366 is compared to a pre-determined pressure threshold (i.e. 16 psig) for a predetermined time period. If the threshold has been exceeded, no control action is taken and the cycle counter is incremented and test continues to execute. If the output pressure is below the threshold, the device solenoid 304 is activated and the fluid from the device controlled fluid supply 320B is supplied for a pre-determined period of time to make and adjustment or take corrective action. As the test continues to operate, the electronic test controller 311 makes repetitive pressure signal corrections, as required, through the fluid control system 330 to control the control valve assembly with the independent supply from second alternate supply 320B.

This process continues until the consumption measurement is complete. Upon conclusion of the consumption measurement, all solenoid valves 338A, 338B, 344, and 304 are de-activated. Final tank pressures and final tank temperatures are recorded, and the time of conclusion of the consumption measurement is recorded. Again, the count or accumulated value of the counter is recorded. The electronic test controller 11 then utilizes the initial and final tank pressures and temperature data to calculate fluid consumption by the process control instrument 302 and the control valve assembly 314 as previously described.

The various embodiments disclosed herein are not limited to measuring fluid consumption or emissions of process control systems having controllers and control valves. The systems and methods disclosed herein could be used to measure fluid consumption of a multitude of fluid operated field devices. For instance, in addition to controllers, the systems and methods described herein can be employed to measure the gas consumption of pneumatically-operated pumps, transducers, switches, and the like.

Figure 9:
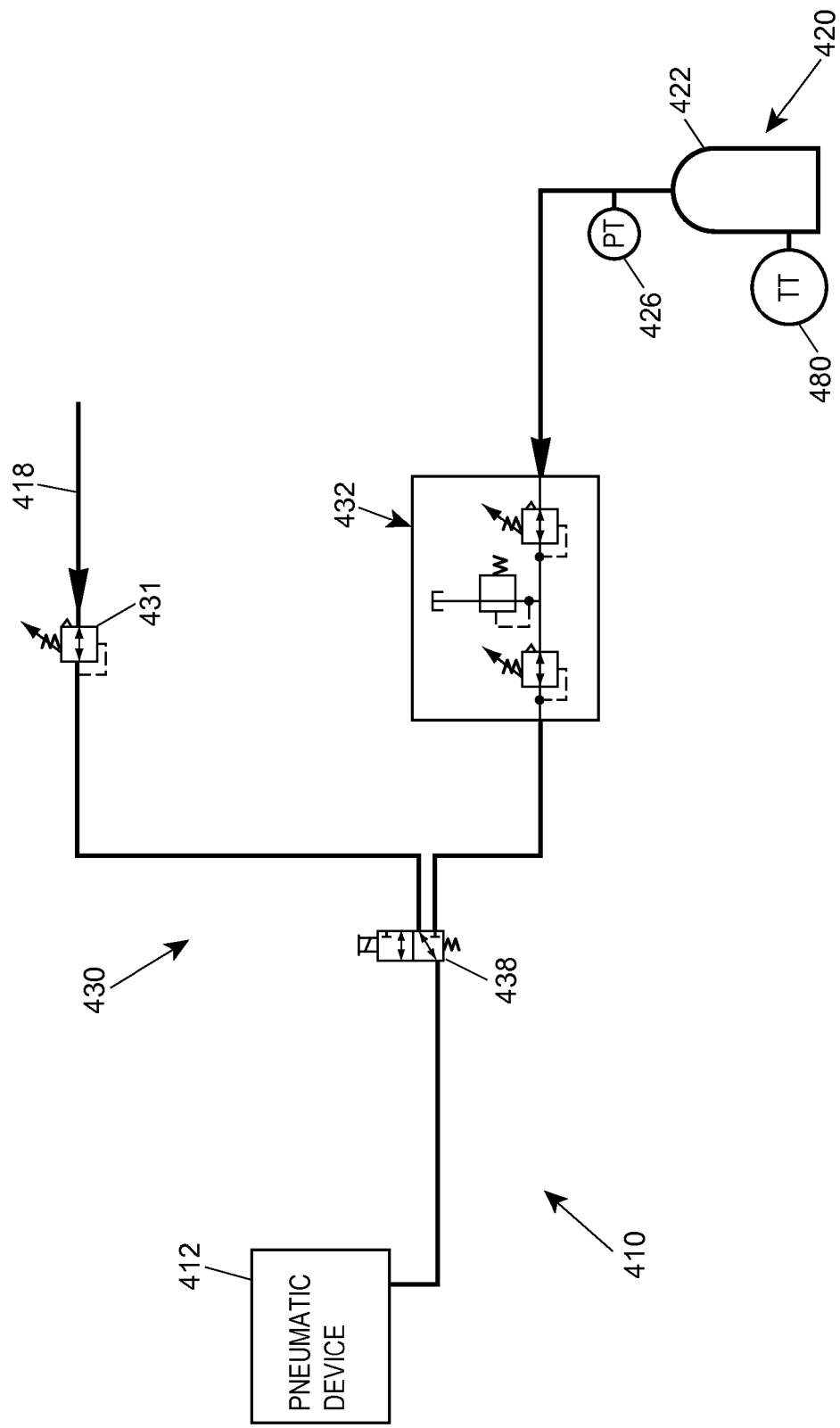
FIG. 9 is a schematic diagram illustrating a process control system in combination with an example embodiment of a fluid consumption measurement system contemplated by present disclosure.

Turning to FIG. 9, another embodiment contemplated by the present disclosure illustrates a fluid consumption measurement system 410 that may be applicable to measure the fluid consumption of a pneumatic control device 412, such as a glycol pump. In the present embodiment, a controlled fluid supply 420, such as a tank 422, is provided in selective communication with the pneumatic control device 412 through a fluid control system 430 consisting of an individual, three-port, dual position solenoid valve 438 of the type previously described. The solenoid valve 438 may be activated by a manual switch, as previously described, or connected to an electronic test controller (not shown). This simplified version of a fluid consumption measurement system also provides adjustable pressure regulator 432, as previously described, in series at the output of the controlled fluid supply 420, to regulate the downstream pressure of the controlled fluid supply to match the regulated pressured of the instrument fluid supply 418 coming from the instrument supply regulator 431. Additionally, conventional pressure and temperature transmitters 426 and 480 are connected to the controlled fluid supply to record the test parameters necessary to calculate the remaining volume of fluid in the tank 422 upon conclusion of the consumption measurement.

Figure 10:
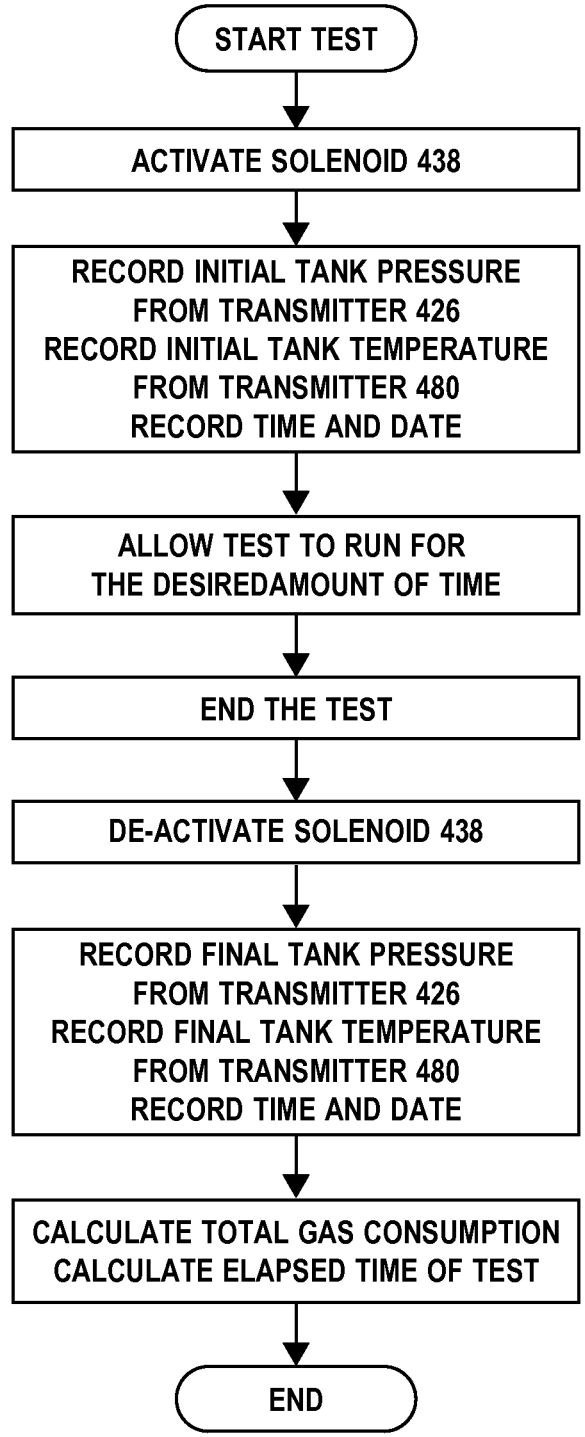
FIG. 10 is a logic flow chart describing the operational steps of the fluid consumption measurement system of FIG. 9.

As illustrated in control logic of the flow chart of FIG. 10, upon initiation of a consumption measurement, the solenoid valve 438 is activated, thereby switching the source of fluid to the pneumatic device 412 from the instrument fluid supply 418 to the controlled fluid supply 420. The pressure transmitter 426, provided at the outlet of the controlled fluid supply 420, detects and transmits an initial pressure of fluid within the tank 422 and the temperature transmitter 480 detects an initial temperature within the tank 422 as the test commences.

The initial temperature and initial pressure data may be transmitted to a processor (not shown) that is part of an electronic test controller and recorded, such as by storing the data in a memory associated with the electronic test controller. The commencement time of the fluid consumption measurement is also recorded, such as by storing the date and time of commencement of the test in the memory associated with the electronic test controller.

The consumption measurement is permitted to operate for a desired period of time with the pneumatic device 412 operating in a normal operating mode. At the conclusion of the consumption measurement, the solenoid valve 438 is de-activated, thereby switching the source of fluid to the pneumatic device 412 from the controlled fluid supply 420 back to the instrument fluid supply 418. The final pressure and temperature data are collected from the pressure transmitter 426 and the temperature transmitter 480 may be communicated to the processor. The final tank pressure and temperature data, as well as the time of conclusion of the consumption measurement, may be recorded, such as by storage in the memory associated with the electronic test controller. Using the initial and final fluid measurement sand the elapsed time of the test, the fluid consumption of the pneumatic device may be calculated and provided in a usable format, such as in a test report.

Alternate methods for determining quantity of fluid within a tank or other vessel of the controlled fluid supply are considered within the scope of the present disclosure. For instance, co-pending U.S. patent application Ser. No. 10/545,117, assigned to Fisher Controls LLC, the assignee of the present disclosure, and which is incorporated herein by reference (to the extent it does not further incorporate by reference other patent applications), discloses a system and method for determining the quantity of fluid within a container based on the time required to drive pressure within the container to a predetermined pressure.

The system and method disclosed in that patent application could be employed at one or multiple times in conjunction with, instead of, or in addition to the other methods described herein in order to determine the quantity of alternate fluid consumed during a predetermined period of time in order to derive fluid consumption of a controller and/or an entire process control system. One of ordinary skill in the art appreciates that the process control device includes, but is not limited to, a controller such as a level controller or a position controller, but may also include any other pneumatic instruments, such as pumps, volume boosters, transducers, or switches.

Various' modifications and additions to the systems and methods described herein may be made without departing from the spirit and scope of this disclosure. Accordingly, this description is meant to be taken only by way of example and not to otherwise limit the scope of the appended claims.

We claim:

1. A system for determining a quantity of a fluid expended to operate a process control system comprising:
   a fluid control system operatively coupled to the process control system; and
   a controlled fluid supply being operatively coupled to the fluid control system wherein the fluid control system directs a fluid from the controlled fluid supply to the process control system to determine the amount of fluid expended within by loss due to operation of at least one component of the process control system in a normal operating mode.

2. The system of claim 1, wherein the amount of fluid expended is proportional to one of an absolute measurement or a differential measurement of the fluid within the controlled fluid supply.

3. The system of claim 1, wherein the fluid control system comprises at least a solenoid valve.

4. The system of claim 3, wherein the fluid control system further comprises a plurality of solenoid valves and at least one pressure transmitter.

5. The system of claim 4, wherein the fluid control system further comprises at least one adjustable restriction and at least one check valve.

6. The system of claim 4, wherein the fluid control system is operatively coupled to a communication control device.

7. The system of claim 6, wherein the communication control device comprises an electronic controller further comprising at least a processor, a memory, discrete control circuit.

8. A method for measuring fluid consumption required to operate a component of a fluid-consuming system to which an operating fluid is supplied from a vessel having a quantity of fluid, comprising:
- determining a first pressure of operating fluid within the vessel;
- operating the fluid-consuming system for a predetermined length of time;
- determining a second pressure of supply gas within the vessel after the predetermined length of time;
- calculating a difference between the first pressure and the second pressure; and
- measuring a quantity of gas consumed due to operation of the component.

9. A system for measuring consumption of a supply of fluid by a plurality of process control devices in a plurality of control systems, comprising:
- a plurality of fluid sources, each of said fluid sources having a constant volume;
- a pressure transmitter associated with an outlet of each of the fluid sources; and
- a plurality of first solenoid valves, each of said first solenoid valves being in fluid communication with one of the fluid sources and being adapted to selectively permit fluid communication between said one of the fluid sources and a controller of one of a plurality of control systems.

10. The system of claim 9, wherein the plurality of fluid sources are disposed in a linear arrangement.

11. The system of claim 9, wherein the plurality of fluid sources are disposed in an array.

12. The system of claim 9, wherein the plurality of fluid sources are connected to one another in series.

13. The system of claim 9, wherein the plurality of fluid sources are connected in parallel.

14. The system of claim 9, wherein the plurality of fluid sources, the pressure transmitters, and the plurality of first solenoid valves are provided on at least one mobile support platform.

* * * * *